US009728168B2

(12) United States Patent
Mitani et al.

(10) Patent No.: US 9,728,168 B2
(45) Date of Patent: Aug. 8, 2017

(54) IMAGE PROCESSING APPARATUS

(71) Applicant: OMRON Corporation, Kyoto-shi, Kyoto (JP)

(72) Inventors: Daisuke Mitani, Ayabe (JP); Yuki Taniyasu, Fukuchiyama (JP); Takeshi Yoshiura, Ayabe (JP); Koji Shimada, Ayabe (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 14/494,770

(22) Filed: Sep. 24, 2014

(65) Prior Publication Data
US 2015/0062172 A1    Mar. 5, 2015

Related U.S. Application Data

(63) Continuation of application No. 13/079,938, filed on Apr. 5, 2011, now abandoned.

(30) Foreign Application Priority Data

Apr. 7, 2010   (JP) .................................. 2010-088859

(51) Int. Cl.
G09G 5/377     (2006.01)
G06T 7/00      (2017.01)
G06T 11/60     (2006.01)

(52) U.S. Cl.
CPC ........... *G09G 5/377* (2013.01); *G06T 7/0004* (2013.01); *G06T 11/60* (2013.01);
(Continued)

(58) Field of Classification Search
CPC ...... G09G 5/00; G09G 5/377; G09G 2340/12; G09G 2340/145; G09G 2354/00; G06T 11/60; G06T 2200/24; G06T 2200/32
(Continued)

(56) References Cited

U.S. PATENT DOCUMENTS 9,092,841 B2* 7/2015 Silver ................... G06T 7/0006
2004/0057629 A1* 3/2004 Shikami ............ G01N 21/8851
382/254
(Continued)

FOREIGN PATENT DOCUMENTS

CN    101101629 A    1/2008
CN    101622593 A    1/2010
(Continued)

OTHER PUBLICATIONS

Non patent literature which was cited in the JPOA letter issued on Jul. 28, 2015 in the counterpart patent application.

*Primary Examiner* — Gregory J Tryder
*Assistant Examiner* — Michael Le
(74) *Attorney, Agent, or Firm* — Mots Law, PLLC

(57) ABSTRACT

An image is displayed without impairing visibility, even in the case of a screen having a limited size. A display setting unit includes a target image display unit that displays an image of a workpiece on an LCD, an image selection unit that, in accordance with a selection operation, selects all or part of the image of the workpiece displayed on the LCD, a menu display unit that displays a menu image so as to be overlapped with the image of the workpiece in a translucent state, the menu image being made up of a plurality of parts that are partial images for displaying information or receiving an input operation, and a display switching unit that, in accordance with a switching instruction given via the operation unit, switches the size of the area occupied by the menu image on the LCD.

22 Claims, 14 Drawing Sheets

(52) U.S. Cl.
CPC ...... *G06T 2200/24* (2013.01); *G06T 2200/32* (2013.01); *G09G 2340/12* (2013.01); *G09G 2340/145* (2013.01); *G09G 2354/00* (2013.01)

(58) Field of Classification Search
USPC ....... 345/173, 594, 597, 629, 634, 650, 661, 345/676, 689
See application file for complete search history.

(56) References Cited

U.S. PATENT DOCUMENTS

| | | | | |
|---|---|---|---|---|
| 2004/0100486 | A1* | 5/2004 | Flamini | H04N 5/44582 715/723 |
| 2004/0164991 | A1* | 8/2004 | Rose | G09G 5/02 345/589 |
| 2005/0250549 | A1* | 11/2005 | Watanabe | H04M 1/72583 455/566 |
| 2006/0028483 | A1* | 2/2006 | Kondo | G09G 5/02 345/594 |
| 2006/0107223 | A1* | 5/2006 | Mirtich | G06F 9/4443 715/764 |
| 2006/0222231 | A1* | 10/2006 | Harris | G06T 7/0006 382/141 |
| 2007/0168943 | A1* | 7/2007 | Marini | G06F 8/34 717/108 |
| 2008/0123946 | A1 | 5/2008 | Kiuchi et al. | |
| 2009/0083665 | A1* | 3/2009 | Anttila | G06F 3/0482 715/834 |
| 2009/0201310 | A1* | 8/2009 | Weiss | G06T 11/001 345/594 |
| 2009/0295976 | A1* | 12/2009 | Choi | H04N 5/23293 348/333.11 |
| 2009/0312064 | A1* | 12/2009 | Aida | G06F 3/0481 455/566 |
| 2010/0275143 | A1* | 10/2010 | Fu | G09G 5/377 715/768 |

FOREIGN PATENT DOCUMENTS

| | | |
|---|---|---|
| JP | 2001-149679 A | 6/2001 |
| JP | 2009-116377 A | 5/2009 |

* cited by examiner

IMAGE PROCESSING APPARATUS

CROSS REFERENCE TO RELATED APPLICATIONS

This application is a continuation application of application Ser. No. 13/079,938 filed on Apr. 5, 2011 which claims priority based on 35 USC 119 from prior Japanese Patent Application No. 2010-088859 filed on Apr. 7, 2010, entitled "IMAGE PROCESSING APPARATUS", the entire contents of which are incorporated herein by reference.

BACKGROUND OF THE INVENTION

1. Technical Field

The present invention relates to an image processing apparatus, and in particular to an image processing apparatus that controls display of a processing target image and display of a menu related to image processing functions on the same screen.

2. Related Art

In the field of FA (Factory Automation) and the like, a so-called visual sensor is used as an apparatus for optically detecting defects in half-finished products in the manufacturing process, in finished products before shipping, and the like, and for optically measuring the size of such defects.

When performing detection and measurement with a visual sensor, an image of a workpiece (object) is captured, and inspection and measurement are carried out by performing various types of image processing on the captured image. When a visual sensor is installed at an actual manufacturing site or the like, an image processing apparatus is used to process the captured input image that has been output from the imaging apparatus included in the visual sensor. A user then displays the input image on a monitor, and sets values for various items related to inspection and measurement while checking the displayed input image. A function for displaying an image serving as the processing target and an image processing menu on the same screen is proposed in Patent Document 1, for example.

RELATED ART DOCUMENTS

Patent Documents

[Patent Document 1] Japanese Unexamined Patent Application No. H07-160456

SUMMARY

Patent Document 1 discloses a display method for dividing a display screen into a work area in which the processing target image is displayed and a display area in which the image processing menu is displayed. As long as the screen is sufficiently large, the visibility of the processing target image will not suffer even if the work area and the image processing menu display area are displayed on the same screen at the same time.

However, the screen size is limited in the case of, for example, a mobile display device to be carried around a manufacturing site or the like, and therefore when the area for displaying the processing target image and the image processing menu display area are displayed on the same screen at the same time as in Patent Document 1, the areas will inevitably be small. For this reason, the user cannot sufficiently check the processing target image when selecting an item from the menu while checking the processing target image, and thus operation of such a display is difficult.

An embodiment of the invention provides an image processing apparatus for processing an image of a target object while displaying the image of the target object on a display unit for inspection of the target object, the image processing apparatus including: a target image display unit that displays the image of the target object on the display unit; an image selection unit that, in accordance with a selection operation, selects all or part of the image of the target object displayed on the display unit; and a menu display unit that displays a menu image so as to be overlapped with the image of the target object in a translucent state, the menu image being made up of a plurality of parts that are partial images for displaying information or receiving an input operation, wherein the menu display unit includes a display switching unit that, in accordance with an external switching instruction, switches the menu image displayed on the display unit such that the size of an area occupied by the menu image on the image of the target object is different.

Preferably, in accordance with the switching instruction, the display switching unit performs switching such that the number of parts displayed in the menu image on the display unit is different.

Preferably, in accordance with the switching instruction, the display switching unit switches between display and non-display for all of the parts of the menu image on the display unit.

Preferably, in accordance with the switching instruction, the display switching unit switches between display and non-display of the entirety of the menu image on the display unit.

Preferably, the image processing apparatus further includes: an instruction unit that is operated to give the switching instruction, wherein the instruction unit is fixedly displayed at a predetermined position on the screen of the display unit.

Preferably, the display unit and the image processing apparatus are integrally configured so as to be portable.

According to the apparatus above, a menu image made up of a plurality of parts that are partial images for displaying information or receiving an input operation is displayed overlapped with the image of the target object in a translucent state, and switching can be performed in accordance with an external switching instruction so as to vary the size of the area occupied by the menu image on the display unit. This enables displaying of an image without impairing visibility even on a display unit having a limited screen size. As a result, it is possible to easily operate the image processing apparatus even in the case of selecting all or part of the displayed image of the target object.

BRIEF DESCRIPTION OF THE DRAWINGS

FIG. 4 is a diagram showing an example of a configuration for performing image synthesis processing according to the;

DETAILED DESCRIPTION

Figure 1:
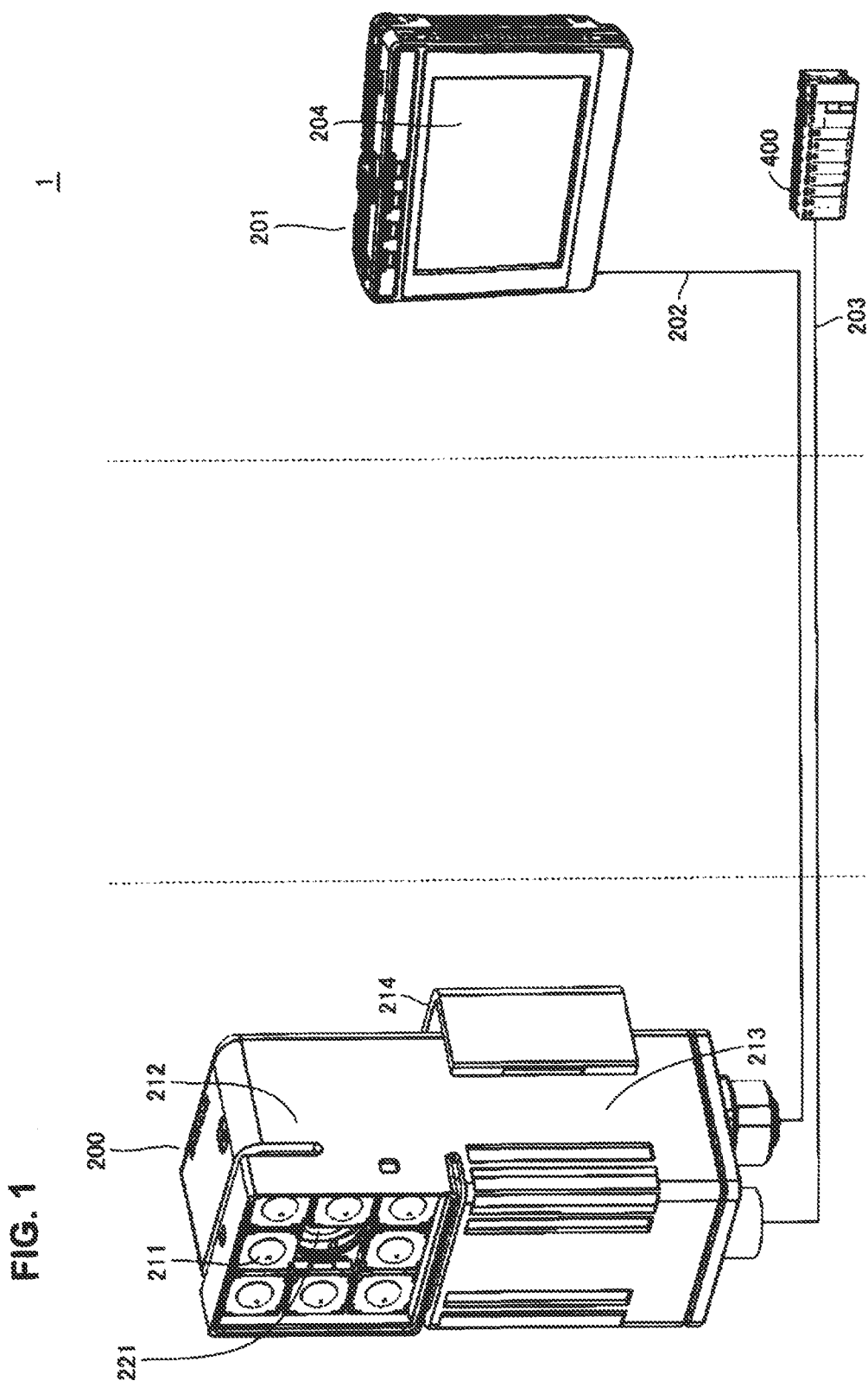
FIG. 1 is a schematic diagram showing an overall configuration of a visual sensor system according to an embodiment.

The following is a detailed description of embodiments of the present invention with reference to the drawings. Note that portions in the drawings that are the same or correspond to each other have been given the same reference signs, and redundant descriptions thereof will not be given.

Although an image processing apparatus is described below as a display setting unit integrally including a screen for display, there is no limitation to this. The screen for display may be provided separately. Also, although the image processing apparatus is provided separately from a visual sensor having an imaging unit for obtaining an input image, the image processing apparatus may be built into the visual sensor.

Figure 2:
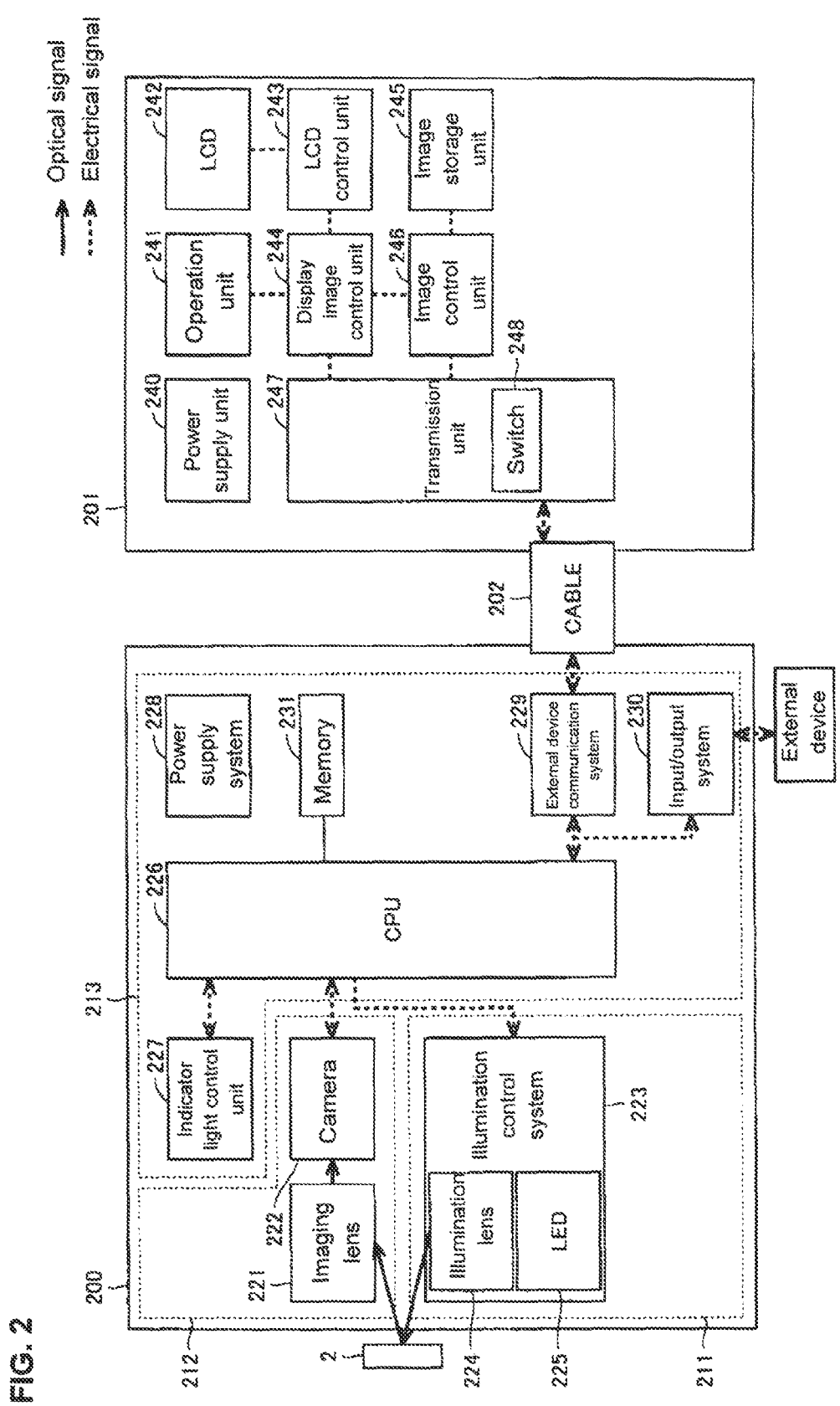
FIG. 2 is a block configuration diagram of the visual sensor system according to the embodiment.
Figure 3:
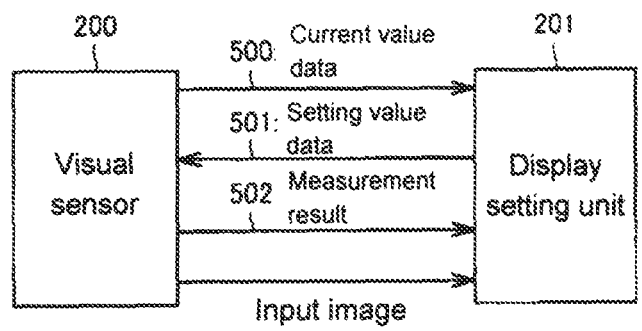
FIG. 3 is a diagram schematically showing data exchanged between a display setting unit and the visual sensor according to the embodiment.

FIG. 1 is a schematic diagram showing an overall configuration of a visual sensor system including an image processing apparatus according to the present embodiment. FIG. 2 shows a configuration of a display setting unit and a visual sensor according to the present embodiment. FIG. 3 schematically shows data exchanged between the display setting unit and the visual sensor according to the present embodiment.

As shown in FIG. 1, in visual sensor system 1 according to the present embodiment, a visual sensor 200 and a display setting unit 201 corresponding to the image processing apparatus are connected by a transmission cable 202 so as to be able to communicate with each other in accordance with a predetermined protocol. An IO cable 203 connects the visual sensor 200 and a PLC (Programmable Logic Controller) 400 so as to be able to communicable with each other. The PLC 400 performs overall control of the visual sensor system 1 by receiving signals from another apparatus and transmitting signals to the other apparatus.

A plurality of visual sensors 200 may be connected to the display setting unit 201 via transmission cable 202 and a hub (not shown). A user can control image processing and image capture processing by transmitting data for image processing and image capture processing to visual sensor 200 via display setting unit 201. Display setting unit 201 receives image processing results from visual sensor 200 and displays them.

Visual sensor 200 is powered from an external power supply (not shown) via IO cable 203.

Visual sensor system 1 is incorporated in a production line, for example. Visual sensor system 1 executes processing such as character recognition and imperfection inspection (hereinafter, also referred to as "inspection processing") based on an image obtained by imaging an inspection target (the later-described "workpiece 2").

Visual sensor 200 includes an imaging unit 212 and a controller unit 213, and imaging unit 212 has an illumination unit 211 and an imaging lens 221. A microcomputer is built into the controller unit 213. The casing of visual sensor 200 is provided with an attachment unit 214 for attaching visual sensor 200 to a support member (not shown).

Display setting unit 201 has an LCD (Liquid Crystal Display) touch panel 204 that includes a LCD integrated with a touch panel for receiving input of an operation instruction due to the LCD screen being touched by a finger or a special-purpose pen. Display setting unit 201 receives image data captured by imaging unit 212 and displays the image data on LCD touch panel 204, and also receives input of an instruction given from a user operation from LCD touch panel 204, and transmits the instruction to controller unit 213 of visual sensor 200.

Next is a description of communication data exchanged between visual sensor 200 and display setting unit 201 with reference to FIG. 3. The communication data includes data that is transmitted from visual sensor 200 to display setting unit 201, namely current value data 500 indicating the current values of various types of parameters related to inspection processing, inspection result data 502, and an input image that imaging unit 212 obtains by capturing an image of the workpiece 2. The communication data also includes data transmitted from display setting unit 201 to visual sensor 200, namely setting value data 501 that has been set for the various parameters related to inspection processing.

Next is a description of the configuration of visual sensor 200 and display setting unit 201 with reference to FIG. 2. Visual sensor 200 includes illumination unit 211, imaging unit 212 for capturing an image of workpiece 2, and controller unit 213. Imaging unit 212 has imaging lens 221 and camera 222.

Illumination unit 211 includes an illumination control system 223 that has an illumination lens 224 and an LED (Light Emitting Diode) 225 serving as the light source.

Controller unit 213 includes an indicator light control unit 227 that controls an indicator light (not shown) such as a lamp, CPU 226 for controlling visual sensor 200, power supply system 228 for supplying power to various units, an external device communication system 229 that is connected to transmission cable 202, an input/output system 230 for inputting and outputting data from and to an external device, and a memory 231 for storing various types of data such as current value data 500 for the various parameters related to images, inspection results, and image processing.

Display setting unit 201 includes power supply unit 240 for supplying power to various units, operation unit 241 such as a touch panel on which an operation is performed to input an external instruction, LCD 242, LCD control unit 243 that controls LCD 242, display image control unit 244 that controls the display of images on LCD 242 via LCD control unit 243, an image storage unit 245 for storing images, an image control unit 246, and a transmission unit 247. Display setting unit 201 has a microcomputer providing the functionality of LCD control unit 243, display image control unit 244, image control unit 246, and the like.

Transmission unit 247 is connected to transmission cable 202 and includes a switch 248 for performing input switching. In the present embodiment, a plurality of visual sensors 200 can be connected to display setting unit 201 via transmission cable 202. Transmission unit 247 has a plurality of input ports for communicating with a plurality of visual sensors 200. Switch 248 selects one of the input ports in accordance with a command from the microcomputer. This enables display setting unit 201 to communicate with visual sensor 200 that is connected to the selected input port.

Display setting unit 201 has been made compact so as to be capable of being carried by a user who patrols a manufacturing line at a manufacturing site or the like, and therefore the screen size of LCD 242 has also been reduced.

LCD 242 displays images based on a control signal from LCD control unit 243. Based on an image signal from display image control unit 244, LCD control unit 243 generates a control signal for controlling display processing performed by LCD 242, and outputs the control signal to LCD 242.

Operation unit 241 includes, for example, switches provided on the outer side of the casing of display setting unit 201, and a tablet (not shown) that covers the surface of LCD 242. LCD 242 and the tablet comprise a touch panel. The user inputs various types of instructions (or commands) to display setting unit 201 via the switches and the touch panel.

Display image control unit 244 generates a synthesized image 303 based on an instruction signal 304 from operation unit 241, an image 306 sent from image control unit 246, an input image 300 received from visual sensor 200 via transmission unit 247, and current value data 500, and outputs synthesized image 303 to LCD control unit 243.

Display image control unit 244 also receives an input of values based on instruction signal 304 from operation unit 241, and outputs the values to transmission unit 247 as setting value data 501. Setting value data 501 are transmitted to visual sensor 200 via transmission unit 247.

Image control unit 246 stores the input image received from visual sensor 200 in image storage unit 245. Image control unit 246 also reads out the image stored in image storage unit 245, and outputs the readout image to display image control unit 244.

In the present embodiment, a display setting screen is displayed on LCD 242 of display setting unit 201 in order to display current value data 500 related to items from inspection processing and to allow the user to input the setting value data 501. The following is a detailed description of a method for generating the display setting screen.

Figure 4:
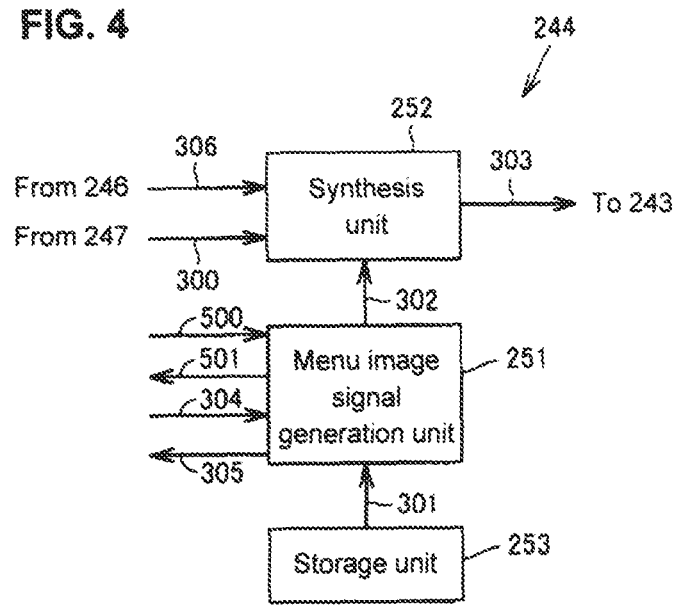

FIG. 4 shows an example of the configuration of display image control unit 244 according to the present embodiment. As shown in FIG. 4, display image control unit 244 includes a menu image signal generation unit 251, a synthesis unit 252, and a storage unit 253.

In the present embodiment, the display setting screen is assumed to be made up of a plurality of setting screens in a hierarchy. Menu image signal generation unit 251 generates menu images 302 that are used in the setting screens. Menu images 302 are made up of a plurality of UI (User Interface) parts, which are partial images for displaying information such as various types of parameter values related to image processing for inspection processing and for receiving a user input operation. The parameter values are adjustable for each image processing item, and the UI parts include, for example, icons and checkboxes for selecting processing items whose parameter values are to be adjusted among the image processing items, and textboxes and slide bars for the input of parameter values. When a UI part corresponding to one of the processing items is designated and an operation is performed thereon, menu image 302 of the next rank in the hierarchy for setting a parameter value for the processing item corresponding to the designated UI part is generated, and a synthesized image 303 generated using that menu image 302 is displayed.

Menu image signal generation unit 251 generates a menu image signal based on information 301 related to the type and location of the UI part read out from storage unit 253, instruction signal 304 output from operation unit 241, and current value data 500 read out from memory 231 of visual sensor 200, and outputs the generated menu image 302 to synthesis unit 252.

Synthesis unit 252 receives an input of images 300 or 306 sent in units of frames and menu image 302 output from menu image signal generation unit 251. Synthesis unit 252 synthesizes menu image 302 in units of frames so as to be superimposed on images 300 or 306, and outputs synthesized images 303 that have been synthesized in units of frames. Menu image 302 sent to synthesis unit 252 corresponds to an input image received from visual sensor 200 that was obtained by imaging workpiece 2, or a captured image of workpiece 2 that was read out from image storage unit 245 of image control unit 246. Note that synthesis unit 252 outputs images 300 or 306 as they are if menu image 302 has not been sent. Accordingly, in this case, synthesized images 303 correspond to images 300 or 306.

LCD control unit 243 receives an input of the synthesized image 303 from display image control unit 244, generates a control signal for displaying the synthesized image 303, and controls LCD 242 using the generated control signal. Accordingly, synthesized image 303 is displayed on the screen of LCD 242 while being updated in units of frame.

Here, menu image signal generation unit 251 and synthesis unit 252 of the present embodiment variably set parameter values indicating the transparency of each pixel of menu image 302 when synthesis is performed. The parameter values are, for example, α (alpha) values in a blend processing related to image transparency processing.

A pixel becomes opaque if the parameter value is set to the maximum value, becomes transparent if the parameter value is set to "0", and becomes translucent if the parameter value is set to an intermediate value therebetween. Since the pixels of menu image 302 to be displayed by LCD 242 are set to be translucent, menu image 302 is displayed superimposed on image 300 in a translucent state. Accordingly, the user can check the current values of the various parameters related to inspection processing and set such values while checking image 300 displayed under menu image 302.

Visual sensor system 1 of the present embodiment has various operating modes, including an adjustment mode in which the values of the various parameters related to inspection processing are set by being adjusted, and an operation mode in which the workpieces 2 on the manufacturing line are subjected to inspection processing. Images (including synthesized images) are displayed by display setting unit 201 in both the adjustment mode and the operation mode. Although a description of image processing in the adjustment mode is provided below, the switching of menu images described below can be similarly applied in the operation mode as well.

Figure 5:
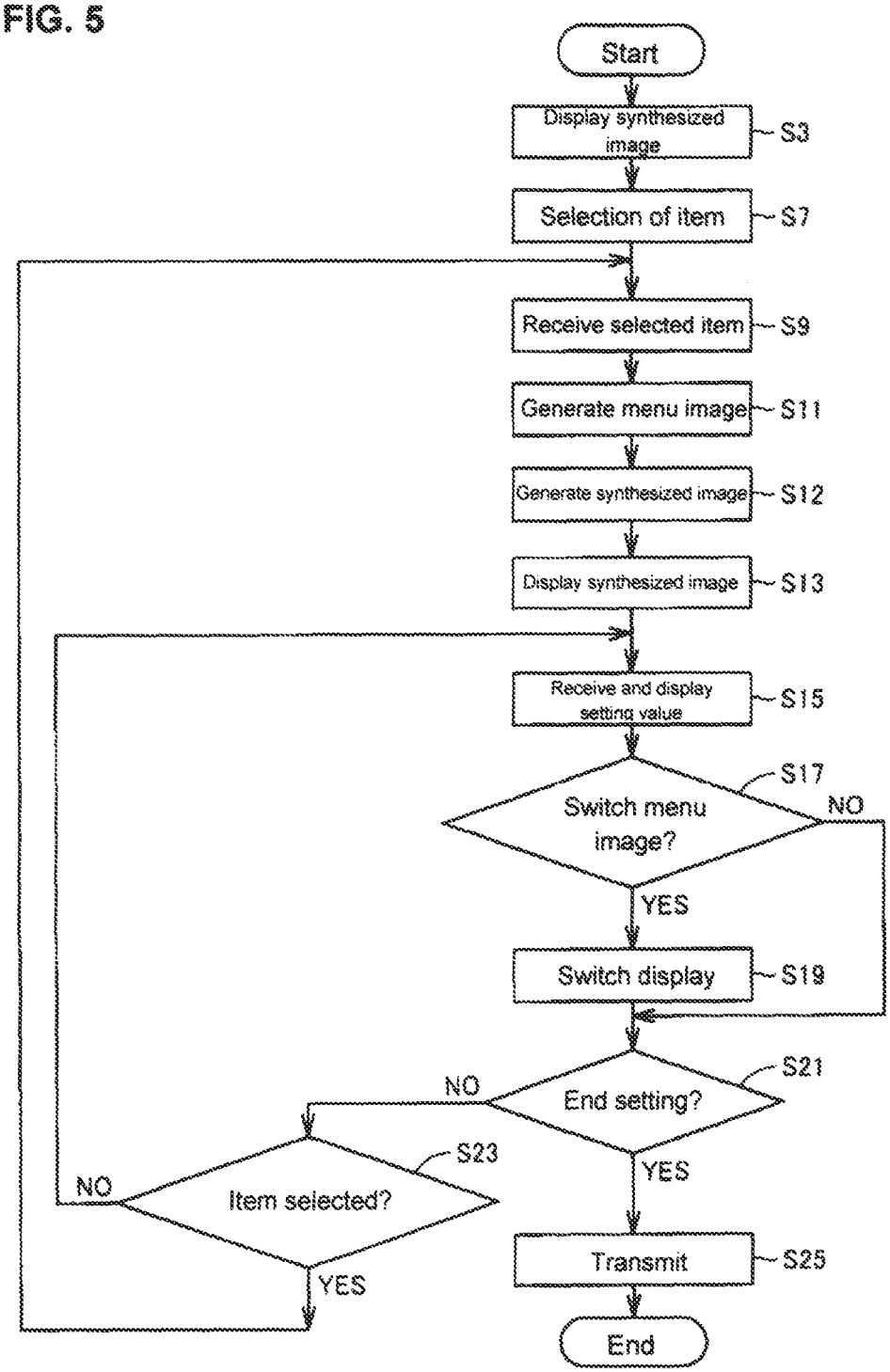
FIG. 5 is a flowchart of image processing in an adjustment mode according to the embodiment.

FIG. 5 shows a flowchart of image processing performed by display setting unit 201 in the adjustment mode according to the present embodiment. The following describes an image processing procedure of the present embodiment with reference to FIG. 5. Note that the image 300 may be replaced with the image 306 in the following description.

When the adjustment mode starts, synthesized image 303 generated by menu image 302 of the highest rank in the hierarchy, being superimposed on image 300, is displayed on LCD 242 (step S3).

When synthesized image 303 is displayed, the user selects an item whose parameter value is to be set by operation unit 241 (step S7). Menu image signal generation unit 251 receives an input of instruction signal 304 corresponding to the selected item (step S9), and generates and outputs menu image 302 of the next rank in accordance with the received instruction signal 304 (step S11). Synthesis unit 252 generates synthesized image 303 by superimposing menu image 302 of the next rank onto image 300, and outputs the synthesized image 303 (step S12). Accordingly, LCD 242 displays synthesized image 303 in accordance with a control signal generated by LCD control unit 243 (step S13).

The user inputs a setting value for any of the various parameters by using operation unit 241 and a UI part in the synthesized image 303.

Instruction signal 304 related to the setting value that was input is sent to menu image signal generation unit 251, and thereafter menu image signal generation unit 251 generates and outputs menu image 302 in accordance with instruction signal 304. Accordingly, synthesized image 303 on LCD 242 is updated to a synthesized image 303 in which a value, data, or the like is displayed in the UI part based on instruction signal 304, and updated synthesized image 303 is displayed (step S15). Note that the setting value that was input and determined is stored as setting value data 501 in a memory area (not shown) associated with menu image signal generation unit 251.

Menu image signal generation unit 251 determines whether instruction signal 304 instructing a switch between menu image 302 that occupies a large area in synthesized image 303 and menu image 302 that occupies a small area in synthesized image 303, has been sent via operation unit 241 (step S17). This switching of menu image 302 will be described later.

If it has been determined that instruction signal 304 for switching menu image 302 has not been sent (NO in step S17), processing moves to the later-described step S21, and if it has been determined that instruction signal 304 has been sent (YES in step S17), display switching processing is performed (step S19).

Each time instruction signal 304 for switching has been sent, menu image signal generation unit 251 operates so as to store instruction signal 304. Accordingly, in the display switching processing, it is possible to determine, based on stored instruction signal 304, whether the occupied area of menu image 302 currently synthesized in synthesized image 303 is large or small.

Using operation unit 241, the user performs a setting end operation if the user desires to end the setting of the parameter value using the UI part in displayed menu image 302, or the user performs an operation for selecting an item in menu image 302. Instruction signal 304 indicating the operation content is output to menu image signal generation unit 251.

If menu image signal generation unit 251 determines that setting is to be ended based on instruction signal 304 (YES in step S21), menu image signal generation unit 251 reads out and outputs setting value data 501 from the memory area. Accordingly, setting value data 501 is transmitted to visual sensor 200 via transmission unit 247 (step S25). CPU 226 of visual sensor 200 stores the received setting value data 501 in memory 231 as the current value data 500. Thereafter, in inspection processing using a captured image obtained by imaging unit 212, processing is executed using current value data 500 that was read out from memory 231.

If menu image signal generation unit 251 determines that an item was selected based on instruction signal 304 (NO in step S21, and furthermore YES in step S23), processing returns to step S9, and subsequent processing is performed in a similar manner for the selected item.

If menu image signal generation unit 251 determines, based on instruction signal 304, that the end of setting has not been instructed, and further an item has not been selected (NO in step S21, and NO in step S23), processing returns to step S15, and processing for inputting a setting value in the currently displayed menu image 302 continues.

Next is a description of examples of the display image displayed on LCD 242 in accordance with the above-described processing procedure shown in FIG. 5, with reference to FIGS. 6 to 12. In these drawings, it is assumed that menu image 302 is displayed synthesized with image 300, which is an enlarged image of the surface (characters) of the workpiece 2.

Figure 6A:
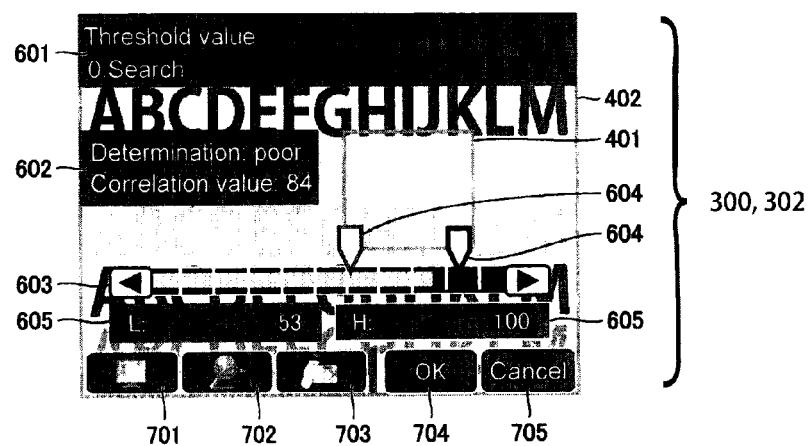
FIGS. 6A and 6B are diagrams showing examples of display screens according to the embodiment.
Figure 6B:
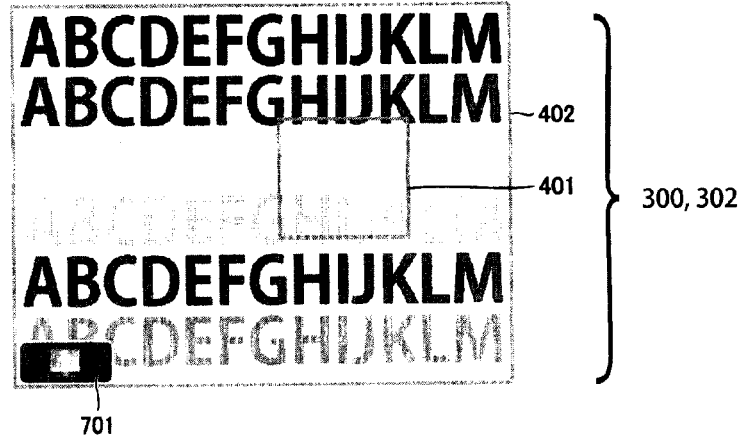

FIGS. 6A and 6B show setting screens for setting a threshold value for a good/poor determination in inspection processing. The image 300 is displayed over the entirety of the screen of LCD 242, and an inspection area frame 402 indicating the inspection range is set to the entirety of image 300 by default. Also, a model area frame 401 input by the user using operation unit 241 is displayed as a graphic in image 300. Model area frame 401 indicates the area of a partial image that is to serve as a reference (model) for inspection processing.

Menu image 302 displayed in FIG. 6A is made up of UI parts such as character string information display units 601 and 602, common buttons 701 to 703, a determine button 704, and a cancel button 705. The character string information display unit 601 is always arranged at the top of the screen and displays information such as the content of setting items and the setting screen being displayed, setting values, and user guidance. The common buttons 701 to 703 are always arranged at the bottom of the screen and are displayed for providing functions common to each of the menu images 302. Since the UI parts constituting menu image 302 are transparent images, the menu can be operated while checking the image 300.

Common button 701 is an example of an icon and is operated in order to input an instruction for switching menu image 302. Common button 701 is displayed fixed at a predetermined position (the bottom left of the screen in the present embodiment) in all of the screens that are displayed by switching, and therefore the user is not likely to lose sight of common button 701 even if the screen is switched.

Common button 702 is operated in order to change how image 300 is displayed (e.g., enlarged or reduced). Common button 703 is operated in order to execute screen capturing. Determine button 704 and cancel button 705 are displayed at the bottom of the screen and are operated in order to determine/cancel setting value data 501 that was input via menu image 302. If the determine operation has been performed, setting values that were input via menu image 302 are determined and stored as setting value data 501 in the memory area associated with menu image signal generation unit 251, and the setting screen is changed to a higher ranking screen. On the other hand, if the cancel operation has been performed, setting values that were input via menu image 302 are canceled, and the setting screen is changed to a higher ranking screen.

In the display state of FIG. 6A, if common button 701 is operated, the UI parts and the like of menu image 302 are hidden except for common button 701 (see FIG. 6B). At this time, model area frame 401 and inspection area frame 402 continue to be displayed. If common button 701 in FIG. 6B is operated, the original UI parts of menu image 302 are again displayed superimposed on image 300 (see FIG. 6A).

Note that UI parts 602 to 605 in FIG. 6A are display units for displaying threshold values (correlation values with respect to a model and a captured image, and the type of determination) indicated by current value data 500 for performing inspection processing using the partial image (model) inside model area frame 401, and slide bars and text boxes for the numerical input of threshold values that are operated via operation unit 241 for setting the correlation value.

In the present embodiment, common button 701 is displayed in synthesized image 303, and menu image 302 can be switched by operating common button 701, and the same follows for all synthesized images 303.

As described above, switching menu image 302 enables changing the number of UI parts in menu image 302 superimposed on image 300, that is to say, enables changing the amount of area occupied by menu image 302 superimposed on image 300. Accordingly, by switching to a menu image 302 that occupies less area, the user can more easily check the entire area of image 300 and make designations.

Also, a configuration is possible in which by enlarging/reducing the UI parts in displayed menu image 302 by operating common button 701, the size of the area occupied by menu image 302 superimposed on image 300 is changed while maintaining the same number of displayed UI parts.

Note that the operation unit for instructing switching of menu image 302 is not limited to being common button 701 that is displayed. An operation switch provided on the casing of display setting unit 201 or the like may be used instead of common button 701. In this case, displaying and not displaying menu image 302 superimposed on image 300 is switched in conjunction with the operation of that switch.

Also, a configuration is possible in which, when menu image 302 has been switched to occupy a small area, the transparency of common button 701 is increased, or the position of common button 701 can be changed by a so-called drag-and-drop operation. Also, a configuration is possible in which common button 701 is not displayed, and switching to the screen in which menu image 302 is displayed is performed by so-called double-tapping the touch panel made up of LCD 242 and the tablet. This enables the user to check the entire region of synthesized image 303 and to make designations without being hindered by common button 701.

Figure 7A:
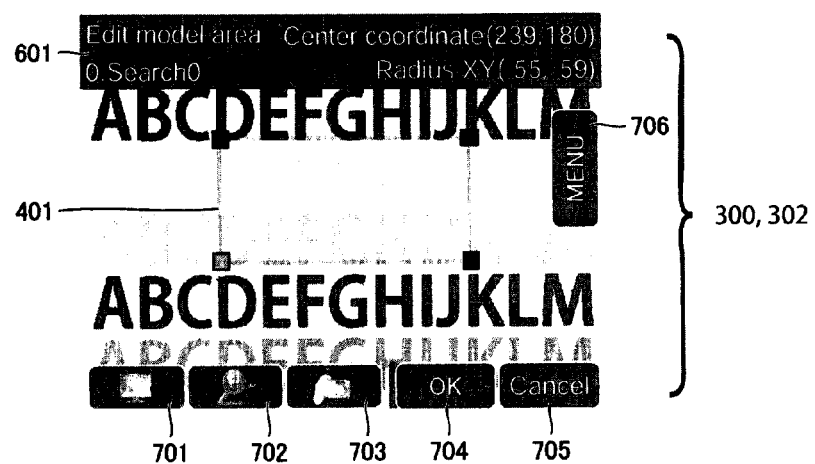
FIGS. 7A and 7B are diagrams showing examples of display screens according to the embodiment.
Figure 7B:
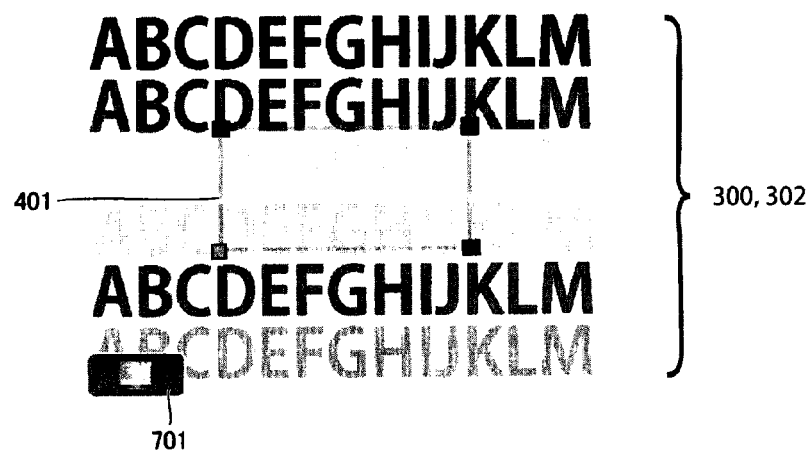

Next is a description of editing of model area frame 401 with reference to FIGS. 7A and 7B. FIG. 7A shows a common button 706 that is operated in order to display various types of setting item selection buttons for model area editing. Specific examples of the selection buttons displayed when common button 706 has been operated will be described later.

In the case of performing editing such as changing the size or position of model area frame 401, editing can more easily be performed if the entirety of image 300 is displayed. In view of this, by cancelling the display of the UI parts of menu image 302 (note that the common button 701 remains displayed) through operation of common button 701 (see FIG. 7B), model area frame 401 becomes easier to edit.

In this way, in the case of selecting part or the entirety of displayed image 300 as an area for inspection processing (the model area or the like), the entirety of image 300 can be checked by hiding the UI parts of menu image 302 through operation of common button 701, thus facilitating the selection of an area. Also, since menu image 302 is displayed superimposed on image 300 in a translucent state, a portion of image 300 that is overlapped with the UI parts of menu image 302 can also be selected as model area frame 401.

Figure 8A:
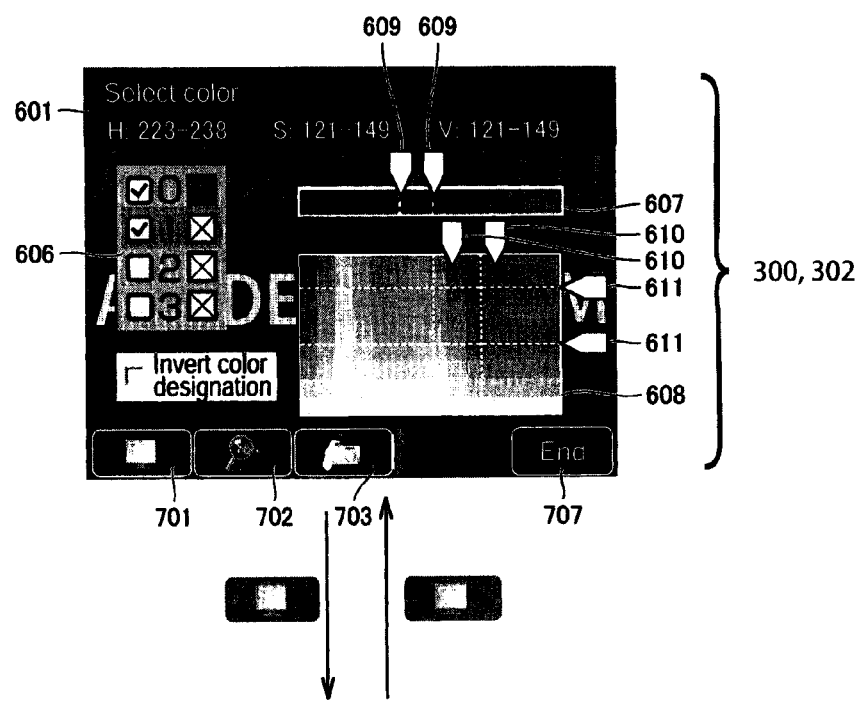
FIGS. 8A and 8B are diagrams showing examples of display screens according to the embodiment.
Figure 8B:
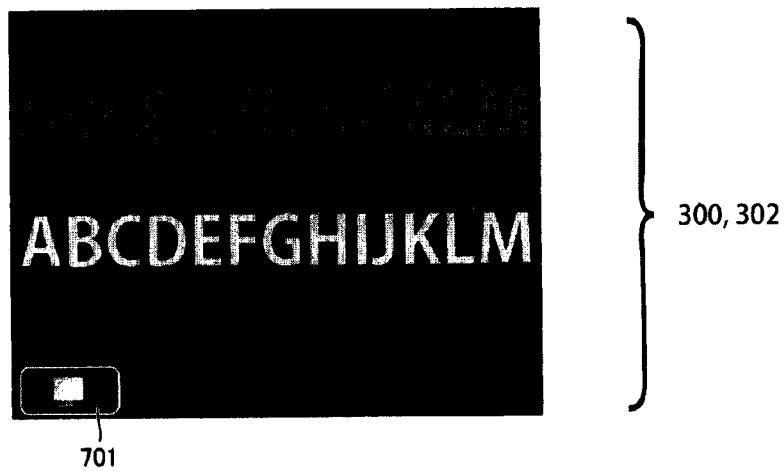

FIGS. 8A and 8B show examples of display screens for setting parameter values related to color extraction in image processing. In the case of color extraction, menu image 302 displayed superimposed on image 300 includes UI parts 606 to 611 for selecting the color of an area to be extracted from image 300. Also displayed is a common button 707 that is operated in order to instruct the end of the setting of parameter values related to color extraction.

UI part 606 shows checkboxes for selecting colors that are to be extracted. UI part 608 indicates a color palette for color selection. The color palette for color selection is provided with UI parts 610 that can slide in the horizontal direction of the screen and UI parts 611 that can slide in the vertical direction of the screen. Sliding UI parts 610 enables setting the degree of hue, and sliding UI parts 611 enables setting the degree of saturation. Furthermore, operating UI parts 609 (sliders) provided on UI part 607 (slide bar) enables setting the color value.

The character string information display unit 601 displayed at the top of the screen displays values (H: hue, S: saturation, and V: value) that are set by sliding the UI parts described above, and these values change in conjunction with the sliding.

If parameter values for color extraction are set via the UI parts of menu image 302, the set values are read out by display image control unit 244 as UI setting values 305. Image control unit 244 extracts areas including the designated colors indicated by UI setting values 305 from image 300, and generates an image 306 in which only the extracted color area portions remain. The generated image 306 is sent to synthesis unit 252 in place of image 300.

Accordingly, since menu image 302 is displayed superimposed on image 306 obtained using the parameter values set via the UI parts, the user can set parameter values as well as check the result of image processing performed using the set parameter values.

At this time, by cancelling the display of the UI parts of menu image 302 (note that the common button 701 remains displayed) through operation of common button 701 (see FIG. 8B), the entirety of image 306 resulting from image processing can be checked.

FIGS. 9 to 12 show other screens displayed in the adjustment mode. Since common button 701 is displayed in these screens as well, menu image 302 can be easily switched between occupying a large area and occupying a small area.

Figure 9A:
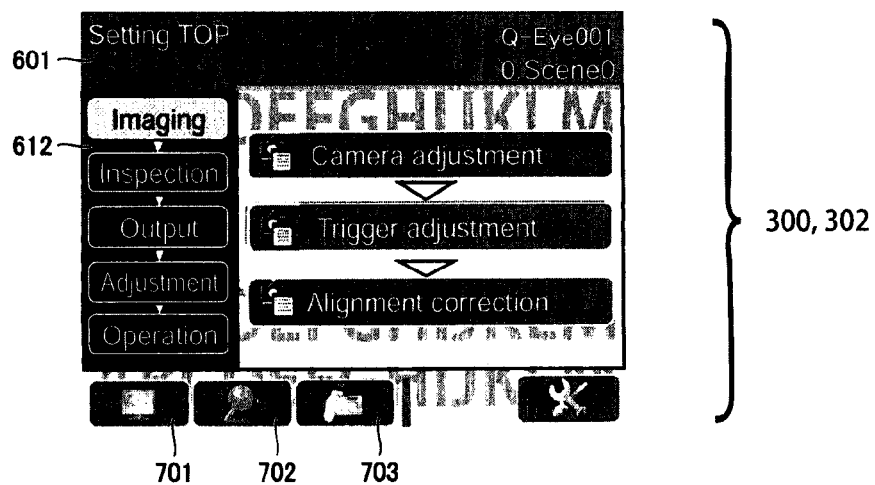
FIGS. 9A and 9B are diagrams showing examples of display screens according to the embodiment.

FIG. 9A shows a high ranking menu image 302 in the adjustment mode. In FIG. 9A, UI part 612 at the left end of menu image 302 shows an item menu showing functions of display setting unit 201. In FIG. 9A, if "Imaging" in the operation item menu has been selected, selection buttons for "Camera adjustment", "Trigger adjustment", and "Alignment correction", which are setting items for imaging, are displayed on the right side of the screen in the order in which setting needs to be performed.

Figure 9B:
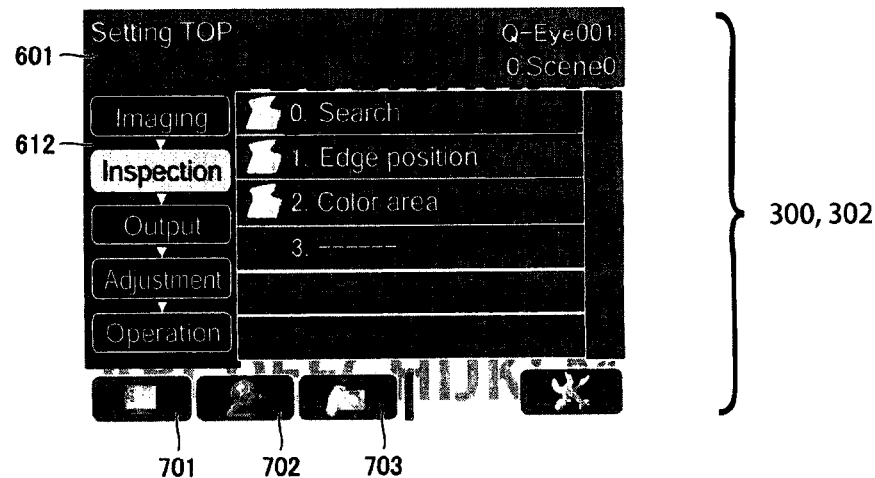

FIG. 9B shows an example of a display in the case where "Inspection" in the operation item menu of UI part 612 has been selected, in which a list of functions used for inspection are displayed on the right side of the screen in a menu format.

Figure 10A:
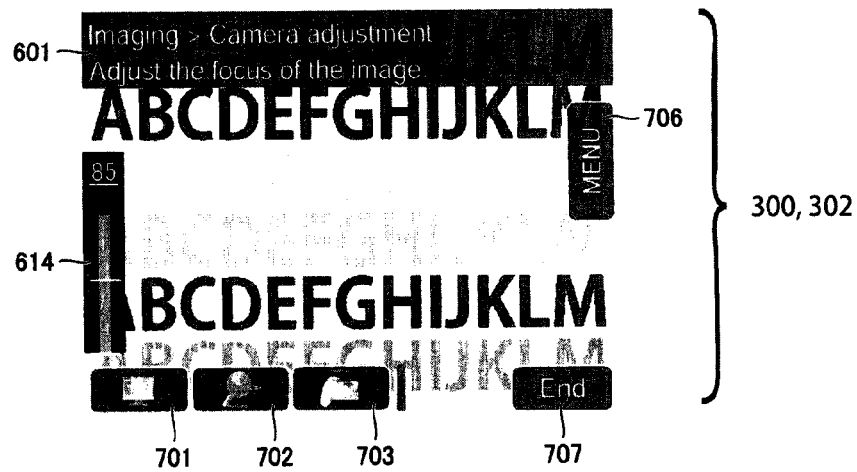
FIGS. 10A to 10C are diagrams showing examples of display screens according to the embodiment.

If "Camera adjustment" has been selected in the setting item menu displayed on the right side of the screen in FIG. 9A, menu image 302 shown in FIG. 10A is displayed. UI part 614 in FIG. 10A is for displaying a number indicating the focus value in image 300 (in FIG. 10A, the value 85), and a corresponding bar graph. The focus value shows the degree to which the focal point of imaging unit 212 coincides with the imaging subject such as a workpiece, and the focus value changes in conjunction with focus adjustment operations performed by visual sensor 200. Note that since the focus value correlates with the quantity of edges that appear in the input image, the focus value can be calculated based on, for example, color deviation included in the input image.

Figure 10B:
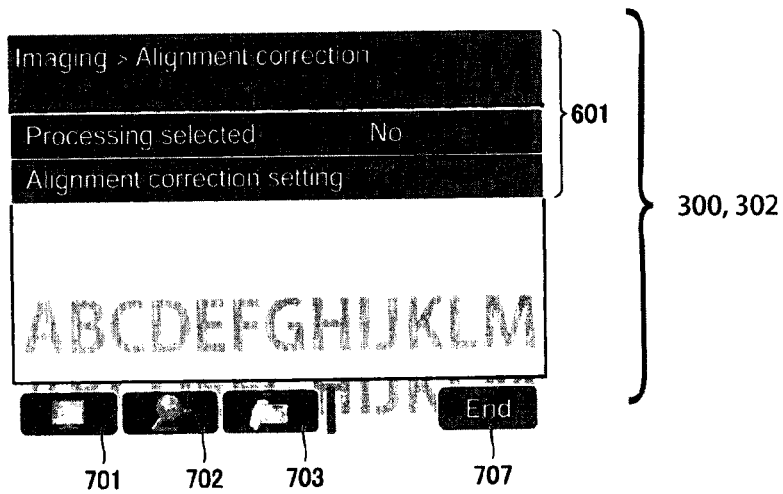

FIG. 10B shows an example of menu image 302 displayed if "Alignment correction" has been selected in the subordinate function menu shown in FIG. 9A. In FIG. 10B, character string information display unit 601 shows whether processing for correcting the alignment of imaging unit 212 is selected, and the fact that it is the alignment correction setting.

Figure 10C:
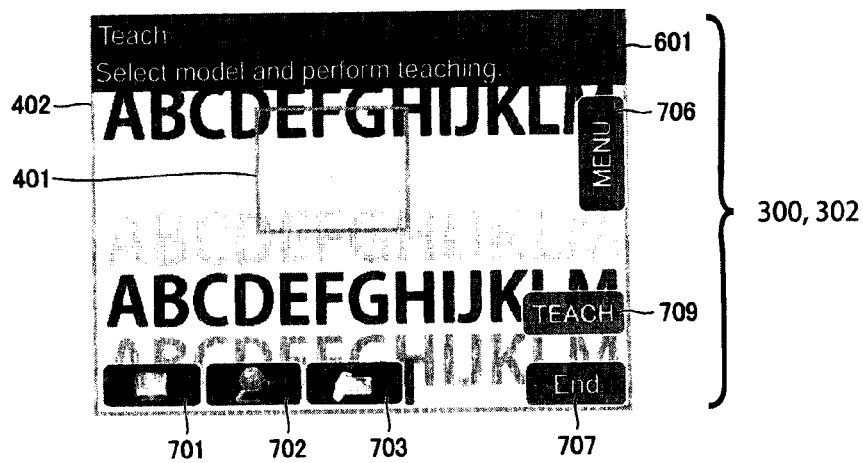

If "Alignment correction setting" was selected in FIG. 10B, menu image 302 shown in FIG. 10C is displayed. In FIG. 10C, UI part 709 for selecting the execution of teach processing for alignment correction is displayed. In teach processing, processing for registering model area frame 401 and inspection area frame 402 that have been set is performed (i.e., processing for storage in a predetermined storage area of display setting unit 201, or processing for transmission to visual sensor 200 and storage in a predetermined storage area).

Figure 11A:
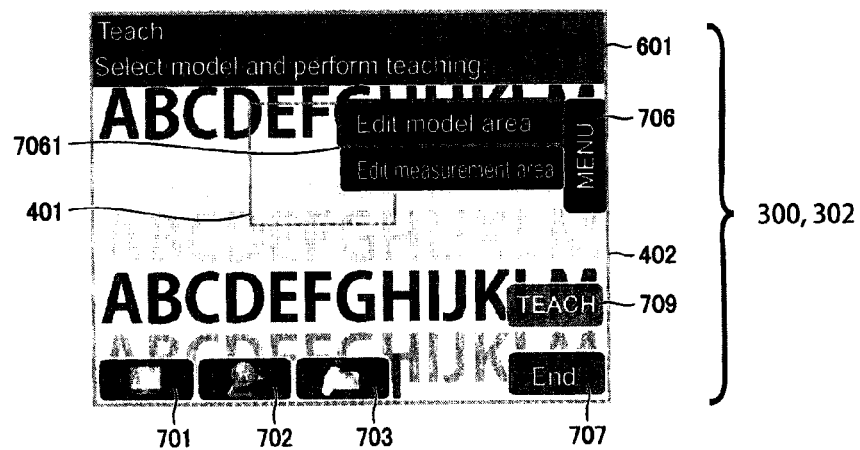
FIGS. 11A and 11B are diagrams showing examples of display screens according to the embodiment.
Figure 11B:
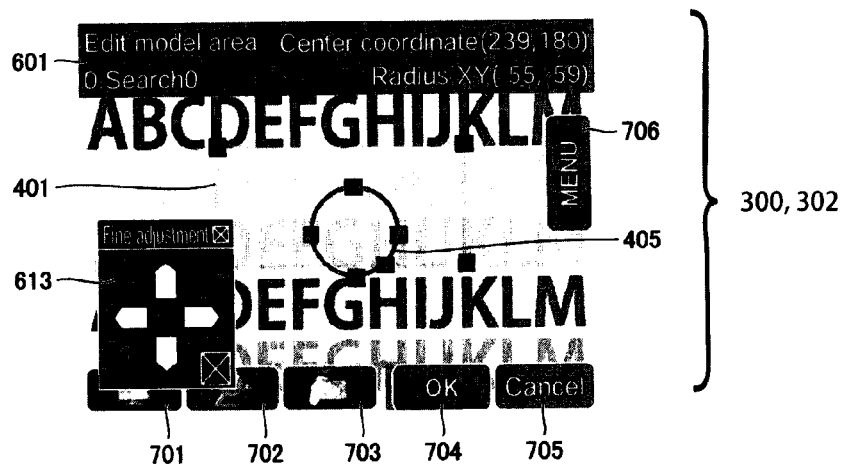

If common button 706 in FIG. 10C is operated, a setting item selection button 7061 is displayed as shown in FIG. 11A. Here, if "Edit model area" is selected, menu image 302 shown in FIG. 11B is displayed, and the model area to be used in alignment correction processing can be set. The model area frames 401 and 405 have been set in FIG. 11B. The position and size of the set model area is detected and displayed in character string information display unit 601. Also, the position and size of model area frame 401 and 405 on image 300 can be changed by operating the UI part 613.

Figure 12:
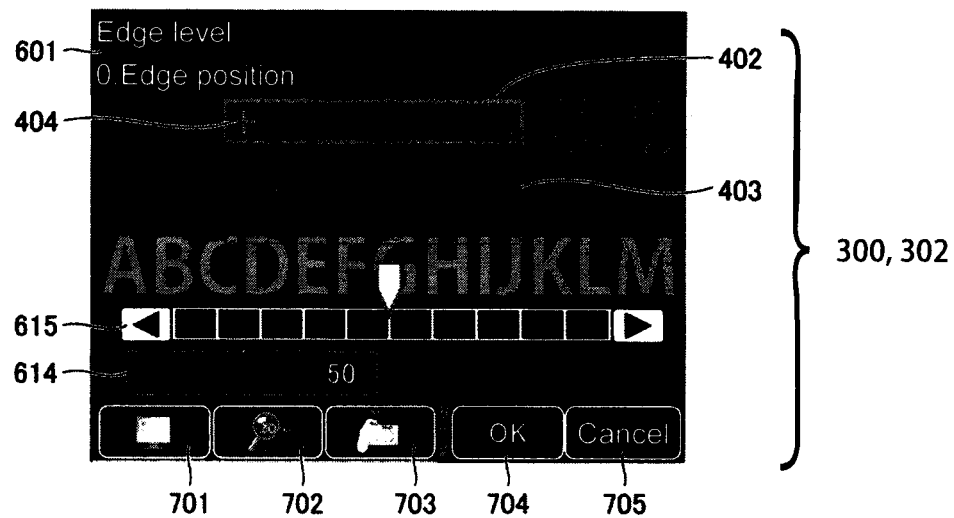
FIG. 12 is a diagram showing an example of a display screen according to the embodiment.

FIG. 12 shows an example of menu image 302 displayed if "Edge position" was selected in the function menu shown in FIG. 9B.

An image edge level is set in the screen shown in FIG. 12. UI parts 614 and 615 for setting the level according to which edges are to be extracted from image 300, as well as an edge graphic 403 are displayed in FIG. 12. In edge graphic 403, the edge level in inspection area frame 402 is detected, position in image 300 is plotted on the horizontal axis of the graph, and edge level is plotted on the vertical axis.

Edge graphic 403 is generated by image control unit 246 performing edge detection based on the brightness component level of each pixel in image 300. The generated edge graphic 403 is displayed superimposed on image 300.

UI part 615 (slider) is displayed in association with edge graphic 403. By operating the slider, the user can determine a desired edge level threshold value while referencing edge graphic 403. Note that the detected edge position is shown by a cross mark 404.

While the slide operation is performed, the set threshold value is numerically displayed in the numerical value input box of UI part 614 while being sequentially updated in conjunction with the slide operation.

In the above-described screens of FIGS. 9 to 12 as well, the entirety of image 300 targeted for processing is displayed, and menu image 302 including translucent UI parts is displayed superimposed on image 300, and in such a screen, switching of the UI parts of menu image 302 can be performed by operating common button 701.

Figure 13:
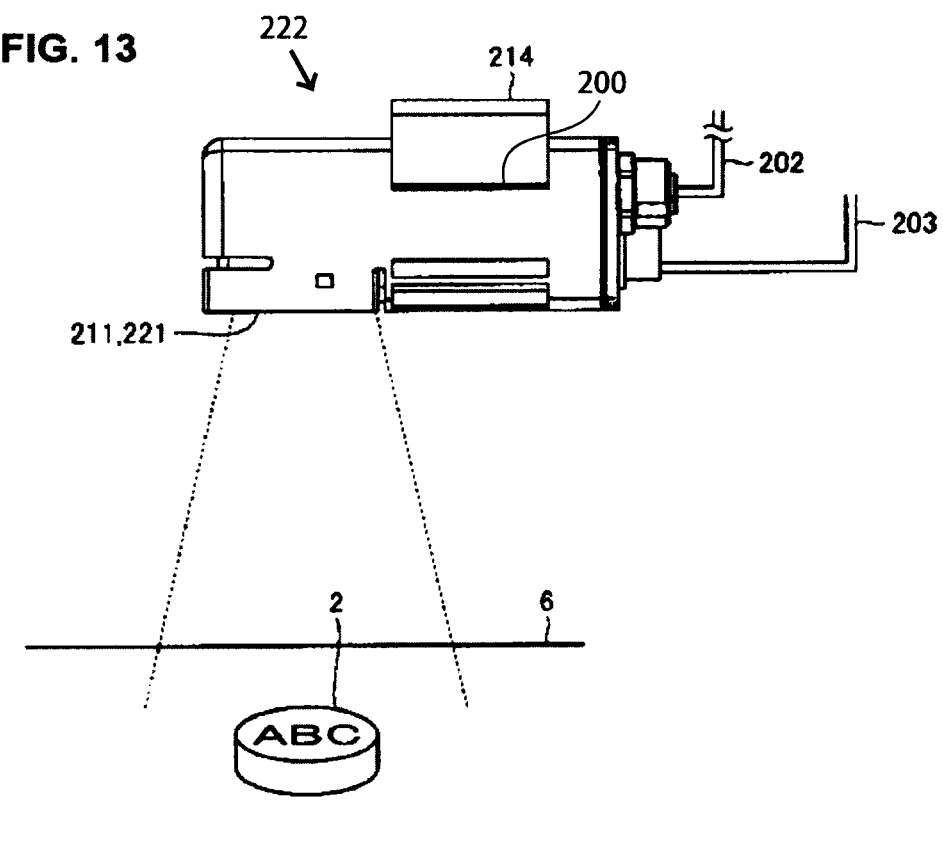
FIG. 13 is a diagram illustrating how the visual sensor according to the embodiment is attached.
Figure 14:
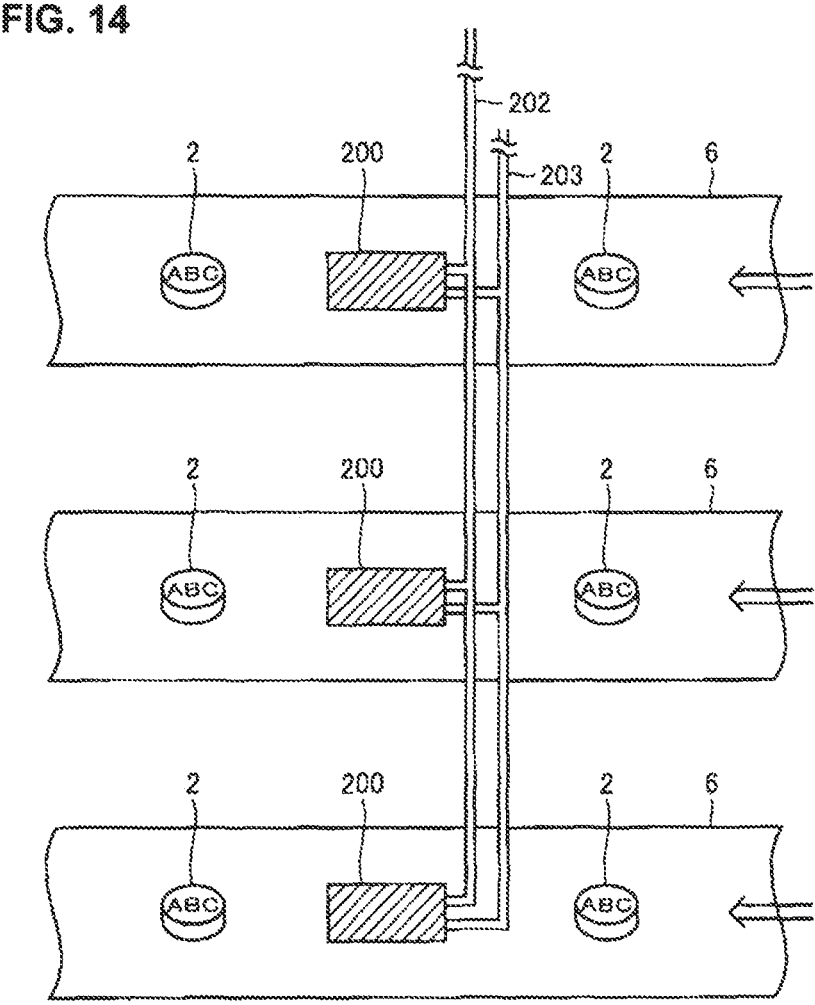
FIG. 14 is a diagram illustrating how a plurality of visual sensors according to the embodiment are attached.

FIG. 13 shows an example of how visual sensor 200 is attached. FIG. 14 shows a state in which visual sensors 200 are respectively attached to conveying lines of belt conveyors or the like, which are a plurality of conveying mechanisms 6 (the arrow in the figure indicates the conveying direction), as viewed from above the conveying lines. In FIG. 13, visual sensor 200 corresponding to each line is attached to a support member (not shown) via attachment unit 214 such that the imaging range of camera 222 is aligned with the conveying line. When imaging is performed, illumination light is irradiated on the conveying line of conveying mechanism 6, thus providing illumination in the imaging range. Visual sensors 200 provided for the conveying lines exchange inspection processing result information, information for inspection processing including the current value data 500, and the like with each other via transmission cable 202.

Other Embodiments

Although the imaging function and the image processing function for inspection processing are provided integrally in visual sensor 200 in the above-described embodiment, these functions may be provided separately and independently as shown in the present embodiment.

Figure 15:
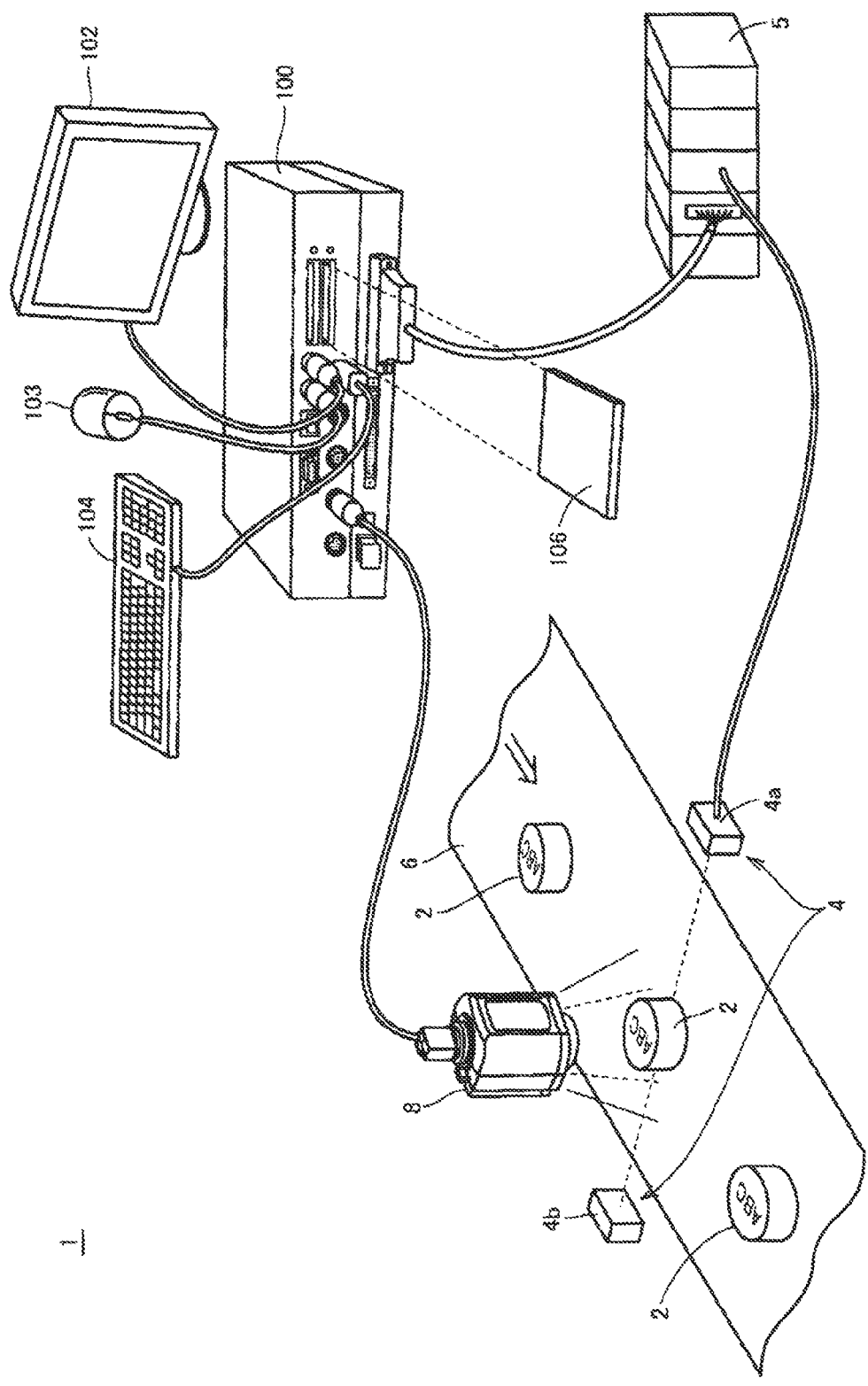
FIG. 15 is a schematic diagram showing an overall configuration of a visual sensor system according to another embodiment.

As shown in FIG. 15, in a visual sensor system 1 according to another embodiment that is incorporated in an FA production/manufacturing line or the like, workpieces 2 that are objects to be subjected to measurement are conveyed in the arrow direction in FIG. 15 by a conveying mechanism 6 such as a belt conveyor, and the workpieces 2 are successively imaged by an imaging apparatus 8 in order to perform inspection processing on the workpieces 2. Image data obtained by imaging apparatus 8 (hereinafter, also referred to as "input images") are transmitted to an image processing apparatus 100. Note that it is possible to further provide an illumination mechanism that emits light onto the workpieces 2 that are imaged by imaging apparatus 8.

A photoelectric sensor 4 made up of two parts disposed on respective sides of conveying mechanism 6 detects the fact that a workpiece 2 has arrived in the imaging range of the imaging apparatus 8. Specifically, photoelectric sensor 4 includes a photoreception unit 4a and a photoemission unit 4b disposed on the same optical axis. The photoreception unit 4a detects the fact that light emitted from the photoemission unit 4b is blocked by workpiece 2, thus detecting the arrival of workpiece 2. A detection signal (hereinafter, also referred to as a "trigger signal") from photoelectric sensor 4 is output to a PLC 5.

PLC 5 receives the trigger signal from photoelectric sensor 4 or the like, and performs control of the conveying mechanism 6.

Visual sensor system 1 in FIG. 15 further includes image processing apparatus 100, a display 102, and a keyboard 104. Image processing apparatus 100 is connected to PLC 5, imaging apparatus 8, display 102, and keyboard 104.

Image processing apparatus 100 has various types of operating modes, namely an operation mode for executing inspection processing on the workpieces 2, and the above-described adjustment mode. In the operation mode, image processing apparatus 100 gives an imaging command to imaging apparatus 8 upon receiving the trigger signal from photoelectric sensor 4 via PLC 5. In response to the imaging command, imaging apparatus 8 transmits an input image obtained by capturing an image of the workpiece 2 to image processing apparatus 100. As an alternative processing method, a configuration is possible in which imaging apparatus 8 is caused to continuously perform imaging, and image processing apparatus 100 obtains only necessary input images in response to receiving the trigger signal.

Imaging apparatus 8 includes, for example, an optical system such as a lens, and an imaging element partitioned into a plurality of pixels, such as a CCD (Charged Coupled Device) or a CMOS (Complementary Metal Oxide Semiconductor) sensor. Imaging apparatus 8 is assumed to be attached such that its installation location, which determines the imaging range, can be changed manually.

Image processing apparatus 100 is a computer having a general-purpose architecture, and provides various types of functions by executing a pre-installed program.

Figure 16:
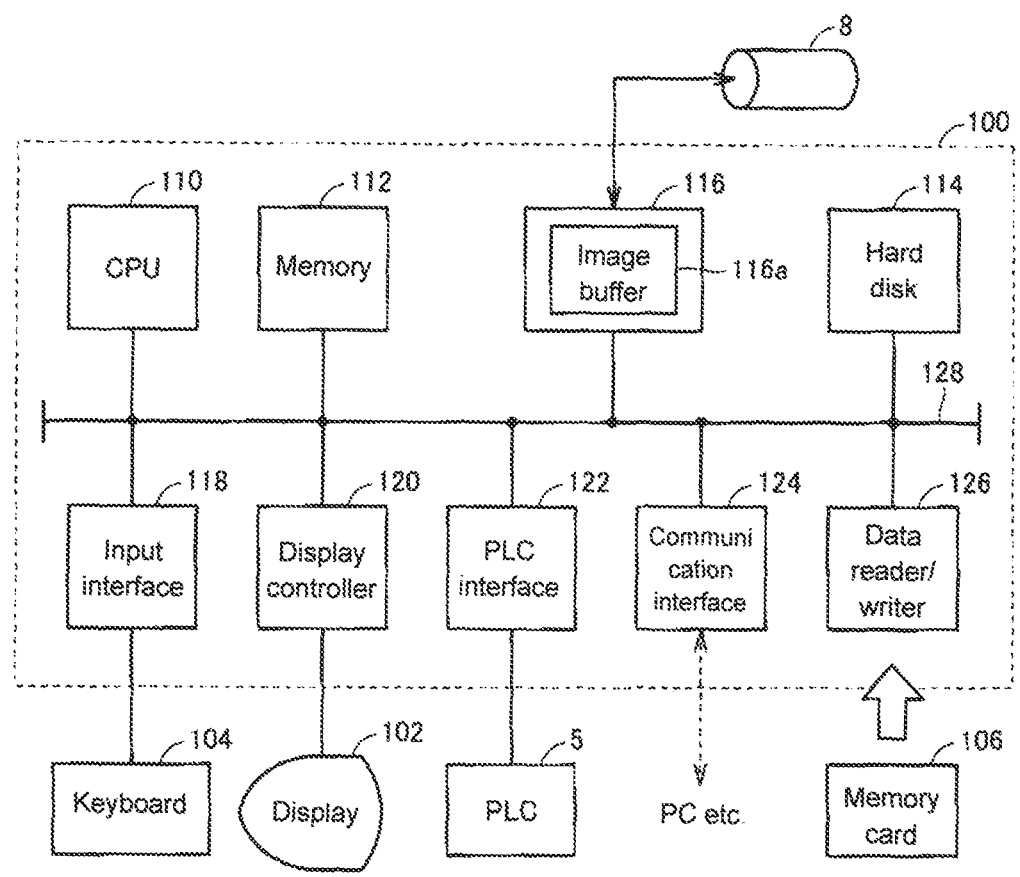
FIG. 16 is a hardware configuration diagram of an image processing apparatus of the visual sensor system according to the other embodiment.

FIG. 16 is a schematic configuration diagram showing image processing apparatus 100 according to this other. As shown in FIG. 16, image processing apparatus 100 includes a CPU 110, which is an arithmetic processing unit, a memory 112 and a hard disk 114, which are storage units, a camera interface 116, an input interface 118, a display controller 120, a PLC interface 122, a communication interface 124, and a data reader/writer 126. These units are connected via a bus 128 such that data can be exchanged therebetween.

CPU 110 performs various types of computation for processing in the operation mode and the above-described adjustment mode by deploying programs (code) stored in hard disk 114 to memory 112 and executing the programs in a predetermined sequence.

Camera interface 116 mediates the transmission of data between the CPU 110 and imaging apparatus 8. More specifically, camera interface 116 includes an image buffer 116a that can be connected to one or more imaging apparatuses 8 and temporarily accumulates image data from imaging apparatuses 8. When at least one frame of input image data has been accumulated in image buffer 116a, camera interface 116 transfers the accumulated data to memory 112.

Memory 112 stores image data in units of image files. In the case of performing processing on an input image, CPU 110 reads out an image file from memory 112.

Camera interface 116 gives an imaging command to imaging apparatus 8 in accordance with an internal command issued by CPU 110.

Input interface 118 mediates the transmission of data between CPU 110 and input apparatuses such as keyboard 104, a mouse 103, and a touch panel (not shown). Specifically, input interface 118 receives an operation command given by the user operating an input apparatus.

Display controller 120 is connected to the display 102, which is a typical example of a display apparatus, and notifies the user of, for example, results of image processing performed by CPU 110.

PLC interface 122 mediates the transmission of data between CPU 110 and PLC 5. More specifically, PLC interface 122 transmits, to CPU 110, information regarding the state of the production line controlled by PLC 5, information regarding the workpiece, and the like.

Communication interface 124 mediates the transmission of data between CPU 110 and another personal computer, a server apparatus, or the like, which are not shown. Communication interface 124 is typically an Ethernet (registered trademark) interface, a USB (Universal Serial Bus) interface, or the like. Note that as will be described later, as an alternative to the embodiment in which a program stored on memory card 106 is installed in image processing apparatus 100, an embodiment is possible in which a program downloaded from a distribution server (not shown) or the like via communication interface 124 is installed in image processing apparatus 100.

Data reader/writer 126 mediates transmission of data between CPU 110 and memory card 106, which is a storage medium.

In visual sensor system 1 shown in FIGS. 15 and 16, display 102 corresponds to LCD 242 in FIG. 2, and the above-described functions of display setting unit 201 in the adjustment mode are executed based on control performed by CPU 110 of image processing apparatus 100. Accordingly, even with the configuration shown in FIGS. 15 and 16, parameter values for inspection processing can be set while menu image 302 is displayed superimposed on processing target image 300 in a translucent state, and menu image 302 can be switched by operating common button 701. This enables more easy operation with respect to the setting of parameter values while checking image 300.

In this way, as explained above, the embodiments provides image processing apparatus that can display an image without impairing visibility, even in the case of a screen having a limited size.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image processing apparatus for processing images of target objects under conveyance on a production line conveyor, the target objects to be inspected, the image processing apparatus comprising:

a target image display unit that displays an image of a target object of the target objects under conveyance on the production line conveyor in an image frame over the entirety of a screen of the target image display unit;

a menu display unit that displays a menu image in a menu frame over the image of the target object in the image frame, the menu image including a plurality of user interface parts displayed in a translucent manner, each of the plurality of user interface parts being a separate image; and a model area frame creation unit that creates, based on a user input, a model area frame displaying a partial image in the image of the target object, the model area frame being positionable by the model area frame creation unit over any portion of the image of the target object in the image frame, the partial image serving as a reference image for inspection processing, the menu display unit comprising a display switching unit that displays the menu image in the menu frame over the target image of the object in the image frame in accordance with a switching instruction, the display switching unit switching a number of the plurality of the user interface parts displayed in the menu image displayed in the menu frame so as to change an amount of area occupied by the menu image displayed in the menu frame over the image of the target object in the image frame, the menu display unit displaying one of the plurality of user interface parts in a form of a slide bar or a chart in a non-translucent manner directly over a portion of the image of the target object in the image frame, the one of the plurality of user interface parts displayed in the form of a slide bar or a chart sets or displays at least one of a plurality of parameters of a color model for image extraction, including hue, saturation, and value, while an image extraction result of the setting of the at least one of the plurality of parameters of the color model is checked using the partial image displayed in the model area frame as the reference image for the inspection processing of the target object while the target objects are under conveyance on the production line conveyor.

2. The image processing apparatus according to claim 1, wherein the one of the plurality of user interface parts in the form of a slide bar sets the parameters in a stepwise manner along the slide bar.

3. The image processing apparatus according to claim 2, wherein the menu display unit further displays another of the plurality of user interface parts over the image of the target object and the another of the plurality of user interface parts sets the at least one of the plurality of parameters from a range between an upper limit and a lower limit of the at least one of the plurality of parameters.

4. The image processing apparatus according to claim 3, wherein an image extracted from the image of the target object is displayed on a display unit, the image extraction being performed based on setting of the at least one of the plurality of parameters.

5. The image processing apparatus according to claim 1, wherein the one of the plurality of user interface parts in the form of a chart is a color palette displayed in a planar form for color selection along two axes of the color palette, and sets two of the parameters along the two axes respectively.

6. The image processing apparatus according to claim 5, wherein the menu display unit further displays another of the plurality of user interface parts over the image of the target object and the another of the plurality of user interface parts sets the at least one of the plurality of parameters from a range between an upper limit and a lower limit of the at least one of the plurality of parameters.

7. The image processing apparatus according to claim 6, wherein an image extracted from the image of the target object is displayed on a display unit, the image extraction being performed based on setting of the at least one of the plurality of parameters.

8. The image processing apparatus according to claim 1, wherein the model frame is positioned at a predetermined position located at an edge of the target image display unit.

9. The image processing apparatus according to claim 1, wherein the plurality of user interface parts comprise:
a first user interface part provided on a first region over the image of the target object, for receiving a first user input of a correlation value with respect to the image of the target object and the reference image; and
a second user interface part provided on a second region over the image of the target object, for receiving a second user input of a correlation value with respect to a type of determination to be made when performing inspection processing, the second region being separate from the first region.

10. The image processing apparatus according to claim 9, wherein the reference image is obtained from the partial image created by the model area frame creation unit.

11. The image processing apparatus according to claim 1, further comprising:
a common icon displayed with a translucency at a predetermined position on the menu display unit; and
wherein, when the menu image that is displayed in accordance with the switching instruction is displayed on the menu display unit in a smaller area than previously displayed on the menu display unit, the common icon is displayed by the menu display unit with an increased translucency.

12. The image processing apparatus according to claim 1, wherein the common icon comprises:
a first translucent icon for receiving the switching instruction;
a second translucent icon positioned adjacent to the first translucent icon, for receiving an image enlarge/reduce instruction; and
a third translucent icon positioned adjacent to the second translucent icon such that the first, second and third translucent icons are displayed in a row on the menu display unit, for receiving a screen capture instruction.

13. The image processing apparatus according to claim 1, wherein the switching instruction is received by way of detection of a user input made to a common icon displayed in a translucent manner at a predetermined position on the display unit.

14. The image processing apparatus according to claim 1, wherein the display switching unit displays the menu image in accordance with the switching instruction such that when the menu image currently occupies a first region over the target object, the menu image is changed to occupy a second region smaller than the first region over the target object, and when the menu image currently occupies the second region over the target object, the menu image is changed to occupy a second region larger than the first region over the target object, the second region being a region having a non-zero length and width.

15. An image processing apparatus for processing images of target objects under conveyance on a production line conveyor, the target objects to be inspected, the image processing apparatus comprising:
a target image display unit that displays the image of the target object of the target objects under conveyance on the production line conveyor in a image frame over the entirety of a screen of the target image display unit;
a menu display unit that displays a menu image in a menu frame over the image of the target object in the image frame, the menu image including a plurality of user interface parts displayed in a translucent manner, each of the plurality of user interface parts being a separate image, the menu display unit comprising a display switching unit that displays the menu image in the menu frame over the target image of the object in the image frame in accordance with a switching instruction, the display switching unit switching a number of the plurality of the user interface parts displayed in the menu image displayed in the menu frame so as to change an amount of area occupied by the menu image displayed in the menu frame over the image of the target object in the image frame; and
a model area frame creation unit that creates, based on a user input, a model area frame displaying a partial image in the image of the target object, the model area frame displaying the partial image being positionable by the model area frame creation unit over any portion of the image of the target object in the image frame, the partial image serving as a reference image for inspection processing, the menu display unit displaying one of the plurality of user interface parts in a form of a slide bar in a non-translucent manner directly over a portion of the image of the target object in the image frame, the one of the plurality of user interface parts displayed in the form of a slide bar enabling a setting of a parameter for the inspection processing while the menu display unit displays a result of image extraction based on the setting of the parameter, and the setting of the parameter is checked using the partial image displayed in the model area frame as the reference image for the inspection processing of the target object while the target objects are under conveyance on the production line conveyor.

16. The image processing apparatus according to claim 15, wherein the menu display unit further displays another one of the plurality of user interface parts selectable to set a criterion for inspection of image extraction from a range between an upper limit and a lower limit of the criterion.

17. The image processing apparatus according to claim 15, wherein the model frame is positioned at a predetermined position located at an edge of the target image display unit.

18. The image processing apparatus according to claim 15, wherein the plurality of user interface parts comprise:
- a first user interface part provided on a first region over the image of the target object, for receiving a first user input of a correlation value with respect to the image of the target object and the reference image; and
- a second user interface part provided on a second region over the image of the target object, for receiving a second user input of a correlation value with respect to a type of determination to be made when performing inspection processing, the second region being separate from the first region.

19. The image processing apparatus according to claim 18, wherein the reference image is obtained from the partial image created by the model area frame creation unit.

20. The image processing apparatus according to claim 15, further comprising:
- a common icon displayed with a translucency at a predetermined position on the menu display unit,
- wherein, when the menu image that is displayed in accordance with the switching instruction is displayed on the menu display unit in a smaller area than previously displayed on the menu display unit, the common icon is displayed by the menu display unit with an increased translucency.

21. The image processing apparatus according to claim 15, wherein the common icon comprises:
- a first translucent icon for receiving the switching instruction;
- a second translucent icon positioned adjacent to the first translucent icon, for receiving an image enlarge/reduce instruction; and
- a third translucent icon positioned adjacent to the second translucent icon such that the first, second and third translucent icons are displayed in a row on the menu display unit, for receiving a screen capture instruction.

22. The image processing apparatus according to claim 15, wherein the display switching unit displays the menu image in accordance with the switching instruction such that when the menu image currently occupies a first region over the target object, the menu image is changed to occupy a second region smaller than the first region over the target object, and when the menu image currently occupies the second region over the target object, the menu image is changed to occupy a second region larger than the first region over the target object, the second region being a region having a non-zero length and width.

* * * * *